(12) United States Patent
Nose et al.

(10) Patent No.: US 7,023,590 B2
(45) Date of Patent: Apr. 4, 2006

(54) PAPER FEEDING APPARATUS

(75) Inventors: Yoshitaka Nose, Kyoto (JP); Daisuke Shige, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1008 days.

(21) Appl. No.: 10/032,603

(22) Filed: Oct. 19, 2001

(65) Prior Publication Data

US 2002/0057466 A1 May 16, 2002

(30) Foreign Application Priority Data

Oct. 26, 2000 (JP) ............................. 2000-326285
Jun. 15, 2001 (JP) ............................. 2001-182329

(51) Int. Cl.
*H04N 1/04* (2006.01)
*G03G 15/00* (2006.01)

(52) U.S. Cl. .................. 358/498; 358/496; 399/367; 399/395

(58) Field of Classification Search ............ 358/498, 358/496, 474, 505, 401, 501; 399/395, 367, 399/370–372, 394; 271/241, 248, 253, 9.06, 271/3.08, 4.01–4.03, 4.08, 10.01, 10.12, 271/10.11, 10.09, 232, 314
See application file for complete search history.

(56) References Cited

U.S. PATENT DOCUMENTS 5,700,002 A * 12/1997 Kato et al. ............... 270/58.12
5,819,152 A * 10/1998 Kobayashi et al. ......... 399/367
5,826,155 A * 10/1998 Kobayashi et al. ......... 399/367

FOREIGN PATENT DOCUMENTS

| JP | 59-018731 | 2/1984 |
| JP | 61-119528 | 6/1986 |
| JP | 61-191335 | 11/1986 |
| JP | 63-162733 | 10/1988 |
| JP | 01-106452 | 7/1989 |
| JP | 07-125857 | 5/1995 |
| JP | 10-305930 | 11/1998 |

* cited by examiner

*Primary Examiner*—Cheukfan Lee
(74) *Attorney, Agent, or Firm*—Hogan & Hartson, L.L.P.

(57) ABSTRACT

A paper feeder including a fixed guide disposed at one side of a paper feeding tray. The fixed guide functions as a standard of position adjustment of documents, and faces in an orthogonal direction against a document transporting direction. The documents are fed from the document feeding tray by a pick-up roller, separated into one-by-one and fed to the downstream by a document separator comprised of a separate roller and a retard roller. These pick-up roller, separate roller, retard roller are disposed within the smallest width size of the documents stacked on the document feeding tray. The documents fed to the downstream are fed to a reading unit by the feed roller mounted in the movable guide side located opposite to the standard line. After the image data of the document is read by the reading unit, the document is discharged to the paper discharging tray by an extra roller.

6 Claims, 7 Drawing Sheets

F I G. 1
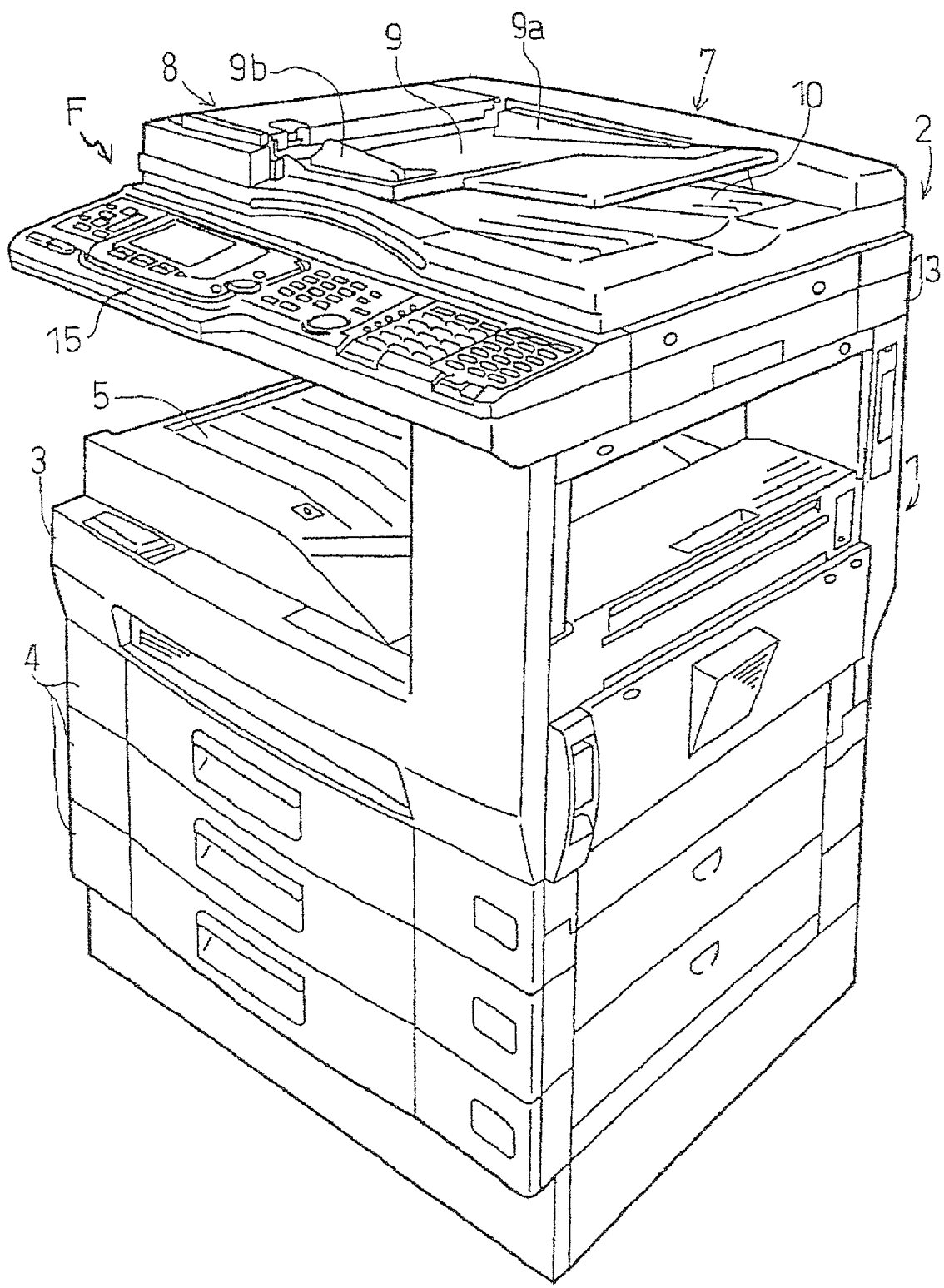

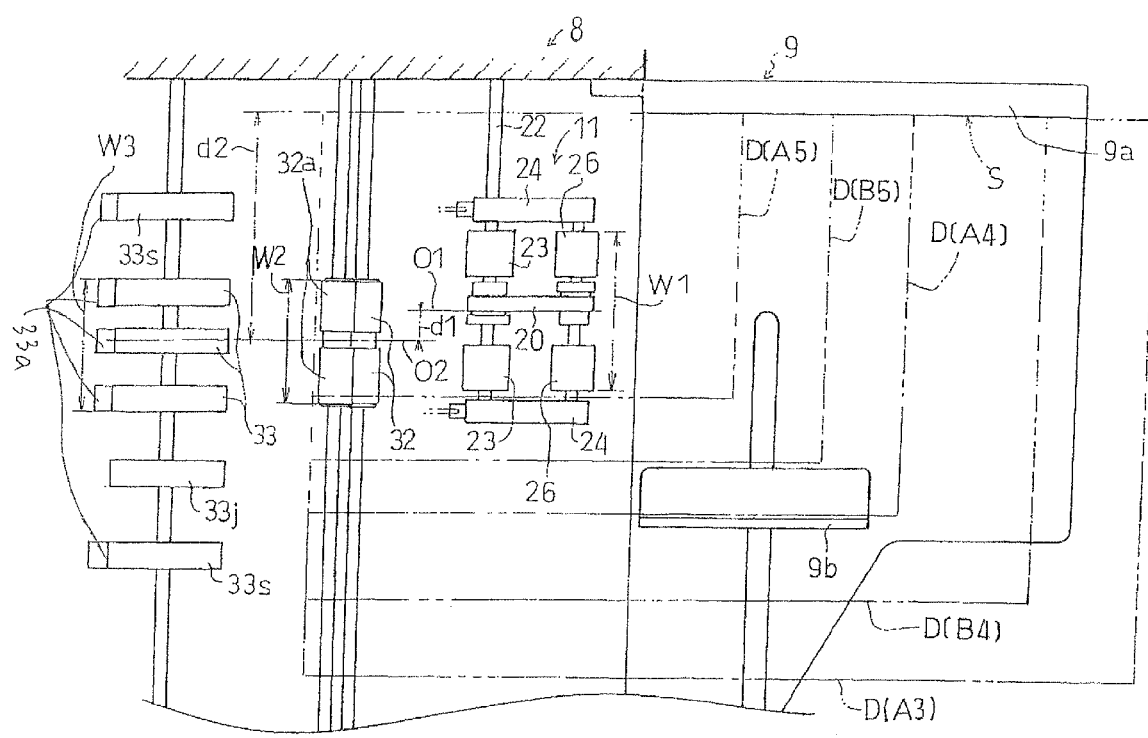
F I G. 4

PAPER FEEDING APPARATUS

CROSS REFERENCES TO RELATED APPLICATIONS

This application claims priority under 35 USC 119 of Japanese Patent Application Nos. 2000-326285 and 2001-182329 filed in JPO on Oct. 26, 2000 and Jun. 15, 2001 respectively, the entire disclosures of which are incorporated herein by reference.

BACKGROUND OF THE INVENTION

1. Field of the Invention

The present invention relates to a paper feeding apparatus for transporting documents to an image reading apparatus or the like, and especially to the arrangement of a document separating roller and a feed roller of the paper feeding apparatus.

2. Description of the Related Art

In a general image forming apparatus, an automatic document feeder (ADF) is attached as a paper feeding apparatus for transporting documents stacked on a document feeding tray to a reading unit.

Both sides of the documents stacked on the document feeding tray of the ADF are controlled by document guides. When the start button provided on a control panel is pressed, a pick-up roller of the ADF descends and starts rotating at the same time, and the documents are then fed into the ADF.

The fed documents are separated into one-by-one and are transported to the downstream by a document separating apparatus comprised of a separate roller and a retard roller, for example. In the downstream of the document separating apparatus, a plurality of feed rollers for transporting the documents to the reading unit are disposed in the direction perpendicular to the transporting direction of the documents (width direction of the documents), and the documents are transported to the reading unit.

Further, the ADF is constructed capable of transporting the documents of various sizes, and for example, corresponds to the sizes of such as the letter size, the legal size or the Japanese Industrial Standards (JIS) of A5 to A3.

Moreover, for example, a transportation method (side registration method) to set one of the side sections of the document transporting path as a standard line is adopted for the paper feeding apparatus transportation method.

In the ADF of the side registration method, the separate roller is disposed at a position in the orthogonal direction against the document transporting direction, a certain distance away from the standard line. A plurality of feed rollers are disposed at a position in the orthogonal direction against the document transporting direction in the downstream of the separate roller, a certain distance away from the standard line.

Furthermore, the centerline of the separate roller in the orthogonal direction against the document transporting direction corresponds to the centerline of a plurality of feed rollers in the orthogonal direction against the document transporting direction.

By aligning the center of the separate roller and the center position of a plurality of feed rollers, and by disposing appropriately the separate roller and the feed roller a certain distance away from the standard line likewise, the separate roller and the feed roller are capable of being contacted against the documents of various sizes, and the transportation of the documents of various sizes can be carried out.

In the manner stated above, by aligning the center position of the separate roller and the center position of the feed roller, and by disposing the separate roller and the feed roller a certain distance away from the standard line, for example, the documents of various sizes such as letter size, legal size or the Japanese Industrial Standards (JIS) A5 to A3, can be fed to the reading unit.

However, in the case the separate roller and the feed roller are disposed at a position capable of transporting the documents of various sizes by aligning the center lines in this manner, out of the documents of the transportable sizes, concerning the documents of small sizes such as the Japanese Industrial Standards (JIS) A5, only a part of the pick-up roller and the feed roller are to overlap the document.

Therefore, since the transporting force applied to the document is not balanced in the width direction, there are problems in which the skew of the documents generates.

To allow the documents of small sizes to be transported straightly, by displacing the separate roller and/or the pick-up roller toward one side of the width direction of the document, the problems mentioned above can be solved.

However, concerning the documents of large sizes, when the pick-up roller is contacted against the documents, the contacting position of the pick-up roller against the documents is to be greatly displaced from the center of the document width. As a result, the documents are to be skewed while contacting, and the documents are to be fed skewed even more by the start of the rotation of the pick-up roller.

To prevent this, there are paper feeding apparatuses comprising a skew correction roller for correcting the documents fed in skew. However, there are problems that the structure is complicated, the number of parts and the cost increase, and the productivity is low.

SUMMARY OF THE INVENTION

With the view of the foregoing, it is an object of the present invention to provide a paper feeding apparatus carrying out the document transportation in the side registration method, and capable of transporting the documents straightly regardless of the size of the documents.

According to a first aspect of the present invention, there is provided a paper feeding apparatus wherein one side facing in the direction orthogonal to the document transporting direction is the standard line of the position adjustment of the documents, and a pick-up roller is disposed within the smallest document width of various transportable document sizes. Therefore, even when transporting the document of the smallest size out of the various transportable sizes of the documents, the pick-up roller can be contacted against the documents evenly, the skew feeding of the documents can be prevented, and stable separation and transportation can be carried out.

According to a second aspect of the present invention, there is provided a paper feeding apparatus wherein a separate roller disposed in the downstream of the pick-up roller is within the smallest document width. Therefore, since the documents fed straightly by the pick-up roller can be transported by being contacted against the separate roller evenly, the skew of the documents can be prevented, and a stable separation and transportation can be carried out under a normal state.

According to a third aspect of the present invention, there is provided a paper feeding apparatus wherein a feed roller is disposed in the downstream of the separate roller, and the center of the feed roller in the orthogonal direction against the document transporting direction is displaced toward the opposite side of the standard line of the paper feeding apparatus. Therefore, the document fed straightly by the pick-up roller can be transported straightly to the reading unit by the feed roller in the downstream. As a result, all of the documents of transportable sizes including the document of the smallest size can be fed to the reading unit stably under the normal state.

According to a forth aspect of the present invention, there is provided a paper feeding apparatus having a document feeding tray for stacking documents, a fixed guide disposed on the standard line, a movable guide movably disposed in the opposite side to the fixed guide, and a pick-up roller for feeding the documents stacked on the document feeding tray. Therefore, by disposing, within the smallest document width, the document separating apparatus for transporting the documents by separating into one-by-one, the skew of all the documents of transportable sizes including the documents of the smallest size can be prevented and the documents can be fed stably to the reading unit under the normal state.

According to a fifth aspect of the present invention, there is provided a paper feeding apparatus wherein the fixed guide extends in the document transporting direction to the proximity of the back end of the document feeding tray. Therefore, the overlapping of the documents on the fixed guide can be prevented, and as a result, the skew of the document can be prevented.

According to a sixth aspect of the present invention, there is provided a paper feeding apparatus wherein the pick-up roller is provided with at least two rollers. Therefore, the contacting force of the pick-up roller against the documents can be balanced, and the skew of the documents can be prevented in the case the pick-up roller contacts with the documents. Moreover, the intervals of a plurality of the pick-up rollers can be set freely, the documents can be fed more straightly by securing enough intervals, and a low cost, stable paper feeding operation can be carried out compared with the case in which the wide roller is adopted.

According to a seventh aspect of the present invention, there is provided a paper feeding apparatus wherein a warp preventing member for preventing the documents contacting against the inner wall surface from being warped in the vertical direction is provided on one of or both of the fixed guide and the movable guide. Therefore, it is possible to prevent the documents from warping and overlapping the fixed guide or the movable guide during the feeding. Furthermore, the documents are to be slided straightly along the fixed guide, and the skew of the documents can be prevented.

Additional objects, aspects, benefits and advantages of the present invention will become apparent to those skilled in the art to which the present invention pertains from the subsequent detailed description and the appended claims, taken in conjunction with the accompanying drawings

BRIEF DESCRIPTION OF THE DRAWINGS

FIG. 1 is a perspective view showing a facsimile apparatus comprising an automatic image reading apparatus provided with an automatic document transporting apparatus;

FIG. 4 is a plan view showing an arrangement of a separating roller and a feed roller of the automatic document transporting apparatus of FIG. 3;

DETAILED DESCRIPTION OF THE INVENTION

Figure 2:
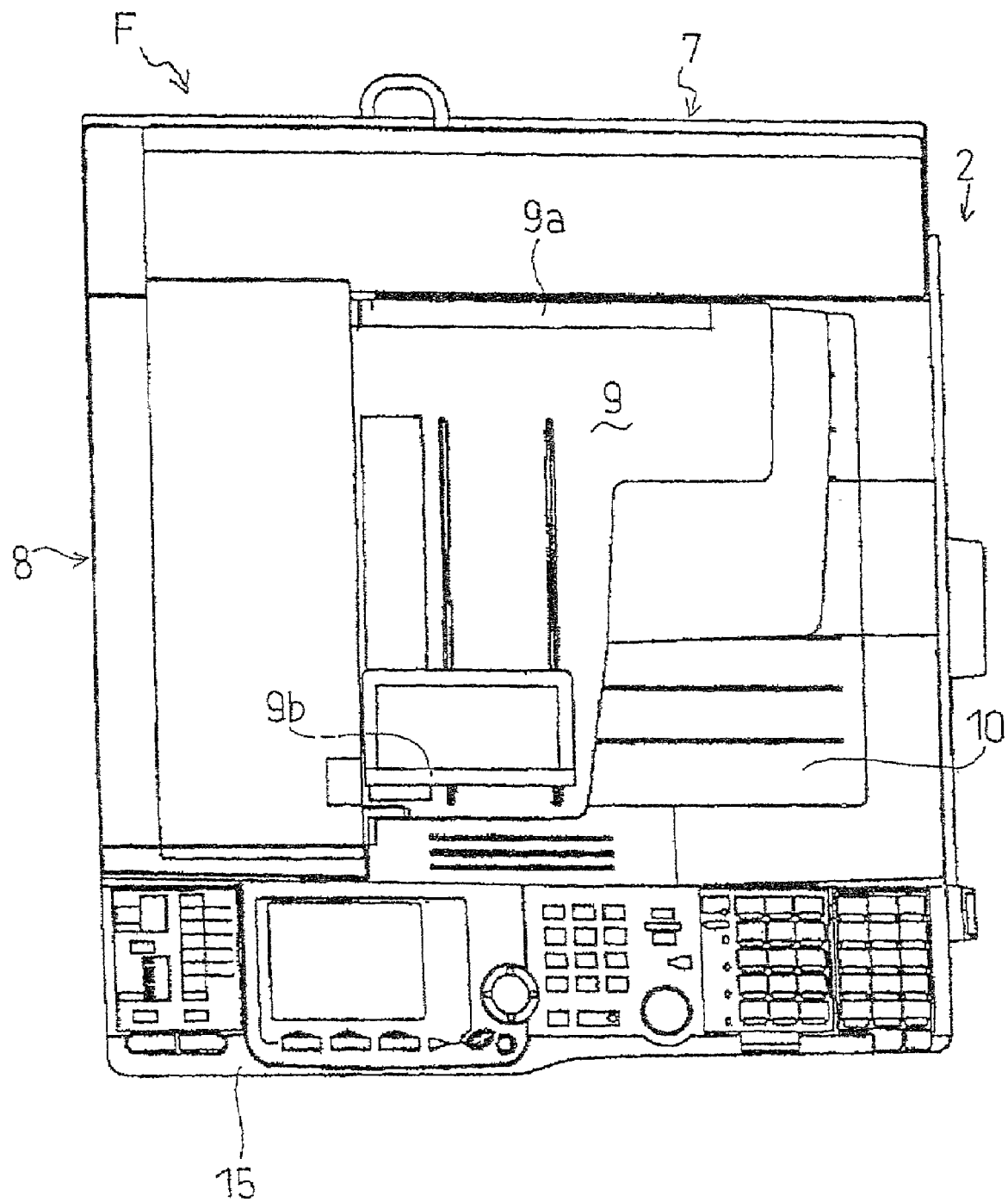
FIG. 2 is a top view of the facsimile apparatus of FIG. 1.

An embodiment of the present invention will now be described in reference to the accompanying drawings.

First, the outlined structure of the facsimile apparatus will be described in reference to FIG. 1 and FIG. 2.

The facsimile apparatus F is constructed by disposing a reading unit 2 over a recording unit 1. In the recording unit 1, a recording device 3 is disposed in the upper part and a paper cassette 4 is disposed in the lower part. Moreover, construction is made such that the sheets to be accumulated inside the paper feeding cassette 4 is discharged from a recording paper discharging tray 5 after being fed to the recording device 3 and recorded therein.

On the other hand, in the reading unit 2, a reading apparatus for reading the image data of the documents or the like is stored in a reading case 13. The document placed on the upper surface of the reading case 13 is scanned by the reading apparatus, and the reading operation is carried out.

Moreover, a document pressing cover 7 constructed so as to be opened and closed by having one of the sides of the reading case 13 as the center is disposed over the reading case 13. The document placed on the upper surface of the reading case 13 is pressed from the upper side by the document pressing cover 7.

Furthermore, in one edge section of the document pressing cover 7, an automatic document feeder (ADF) 8 is attached as a paper feeding apparatus for transporting the documents automatically to the reading unit. The documents stacked on a document feeding tray 9 are separated into one-by-one and are transported to the edge section of the upper surface of the reading case 13 by the ADF 8. After the image data of the documents is read by the reading apparatus in a standstill state, the documents are discharged to the document discharging tray 10 formed in the upper surface of the document pressing cover 7. In the document feeding tray 9, a fixed guide 9a is mounted in a fixed state, and a movable guide 9b is mounted such that the movable guide 9b can move in the document width direction according to the size of the documents to be stacked, and supports the document width to prevent the skewing of the documents. Both sides of the documents to be transported by the ADF 8 are guided by the fixed guide 9a and the movable guide 9b. The fixed guide 9 is disposed as a standard of position adjustment of the documents and faces in an orthogonal direction against a document transporting direction.

In other words, the reading unit 2 is constructed so as to be used as a flat bed typed scanner for reading a document placed with the image data facing down by making the reading apparatus carry out scanning, and as a sheet feed typed scanner wherein the reading apparatus reads the documents with the reading apparatus stationarily staying at a position while the documents are being fed.

Moreover, an operation panel 15 is attached to one side of the reading case 13. By operating various kinds of operational keys of the operation panel 15, the reading of the image data of the documents, the setting of the destination when transmitting the read image data by the facsimile, and the recording of the received image data or the read image data by the recording apparatus 3 can be carried out.

Next, the structure of the ADF 8 will be described.

Figure 3:
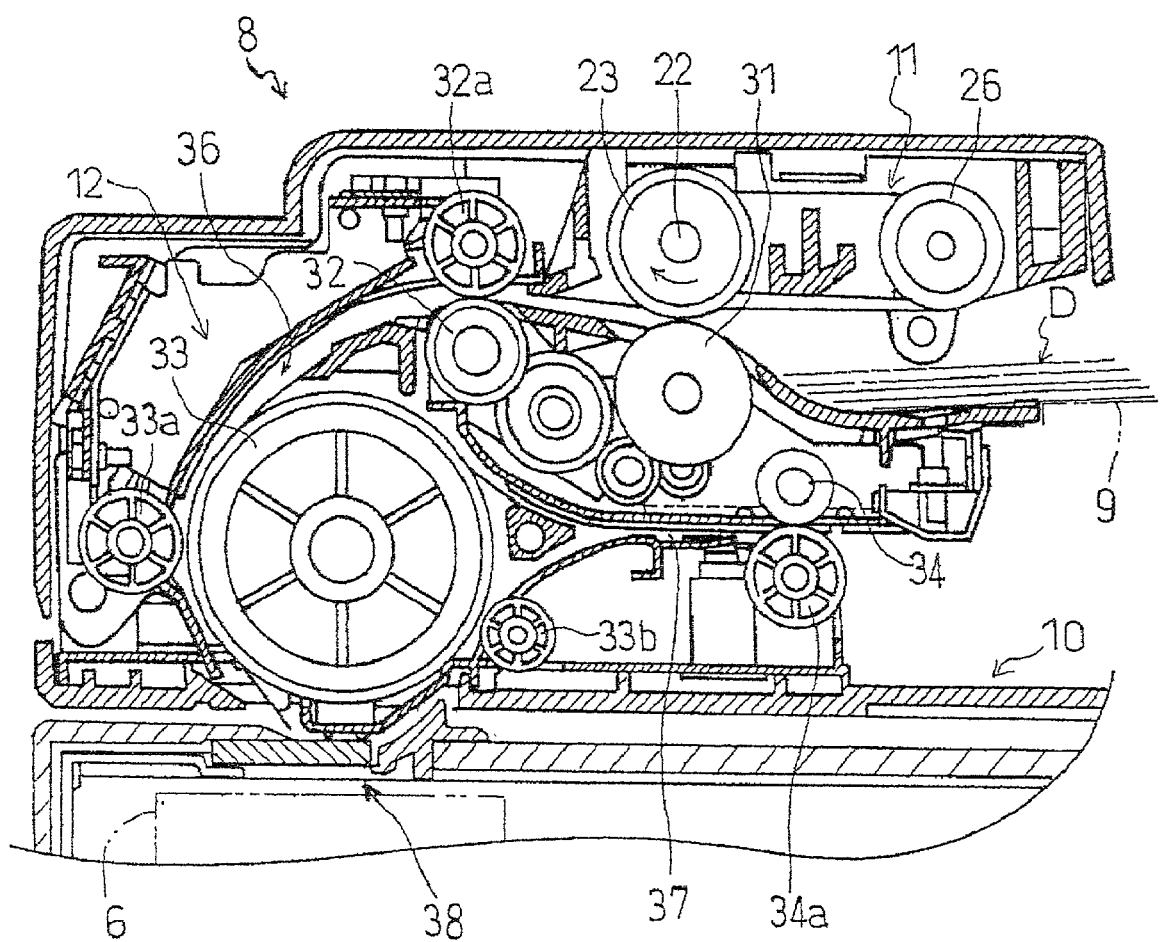
FIG. 3 is a cross-sectional view of the facsimile apparatus of FIG. 1, and shows an automatic document transporting apparatus.

As shown in FIG. 3 and FIG. 4, a document separating apparatus 11 is installed in the upper part of the interior of the ADF 8. The document separating apparatus 11 comprises a separate roller 23 made capable of rotating and driving by a driving shaft 22, an arm 24 provided so as to be capable of swinging with the driving shaft 22 which supports the separate roller 23 as a fulcrum, and a pick-up roller 26 located at the tip section of the arm 24 and rotatably supported.

The rotating driving force of the separate roller 23 is transmitted to the pick-up roller 26 by a belt 20, and a retard roller 31 is contacted against the separate roller 23.

After the uppermost layer of the documents D stacked on the document feeding tray 9 is fed by the document separating apparatus 11, the documents are separated into one-by-one and are sent to a transporting apparatus 12 at the downstream part.

Specifically, a detecting means not shown in the drawings detects whether or not the documents D are stacked on the document feeding tray 9, and when the user presses a start button, the driving shaft 22 is rotated and driven, the separate roller 23 rotates in the arrow direction shown in FIG. 3 accompanying the rotation of the driving shaft 22, and the pick-up roller 26 urged to stay at the upward side is made to swing downward, against the urging force, by the act of a torque limiter (not shown in the drawings) installed in the pick-up roller 26.

When the pick-up roller 26 swings downward and contacts against the upper surface of the documents D, the pick-up roller 26 starts rotating in the same direction with the separate roller 23 by the torque limiter. Since the pick-up roller contacts with the documents without rotating, the skewing of the document can be prevented.

Furthermore, the document D on the uppermost layer is sent to between the separate roller 23 and the retard roller 31 by the rotation of the pick-up roller 26, and is transported to the downstream.

In this case, until the document D is fed in between the separate roller 23 and the retard roller 31, or when a sheet is fed in, the retard roller 31 is rotating in the direction of transporting the document D to the downstream by accompanying the separate roller 23. On the other hand, in the case two sheets or more of the documents D are inserted in between the separate roller 23 and the retard roller 31, the rotating direction of the retard roller 31 is reversed, and the retard roller 31 rotate in the direction of pushing back the documents D of the lower side to the document feeding tray 9 side.

Therefore, the documents D from second page onwards to be fed accompanying the uppermost layer of the documents D to be transported to the downstream are pushed back to the document feeding tray 9 side by the retard roller 31, and only one sheet of the documents of the uppermost layer is separated and transported.

The documents D fed into the ADF 8 by the document separating apparatus 11 are fed out to a paper feeding and transporting path 36 by the separate roller 23 and the retard roller 31, reach the nip section of a first feed roller 32 and an extra roller 32a, and are transported inside the paper feeding and transporting path 36 by the first feed roller 32.

Furthermore, the documents D are transported through the paper feeding and transporting path 36 by a second feed roller 33 and an extra roller 33a, and pass through a document reading unit 38. At this time, the image data of the documents D is read by a reading apparatus 6 (an automatic image reading apparatus 6) in the reading case 13.

Then, the documents D are transported to the downstream by the second feed roller 33 and an extra roller 33b, and are discharged to the document discharging tray 10 via a discharging transportation path 37 by a discharging roller 34 and an extra roller 34a.

Further, a transporting apparatus 12 comprises the first feed roller 32 and the extra roller 32a, the second feed roller 33 and the extra rollers 33a, 33b, the discharging roller 34 and the extra roller 34a, the paper feeding and transporting path 36, and the discharging transporting path 37.

Next, the arrangement of the document separating roller 11, the first feed roller 32 and the second feed rollers 33 of the ADF 8 will be described.

The ADF 8 is constructed such that the documents D of various sizes can be transported. For example, the documents D of the sizes of the Japanese Industrial Standards (JIS) A5 to A3 can be transported. The documents D to be transported are stacked on the document feeding tray 9, with one of the edges arranged to the inner wall surface of the fixed guide 9a which is the position adjusting standard line S, regardless of the sizes of the documents. FIG. 4 shows the state in which the documents D of A5, B5, A4, B4, and A3 sizes according to the Japanese Industrial Standards (JIS) are arranged to the position adjusting standard line S of the fixed guide 9a.

Moreover, the other edge of the documents D is guided by the movable guide 9b capable of moving in the document width directions (FIG. 4 shows the state in which the other edge of the documents D of the A4 size is being guided). In this example, the movable guide 9b is capable of moving from the other edge position of the A5 sized document to the other edge position of the A3 sized document.

The pick-up roller 26, and the separate roller 23 and the retard roller 31 of the document separating apparatus 11 are respectively provided in proximity in a row arrangement in a plurality (in this example, two) with appropriate intervals in the direction orthogonal to the document transporting direction (in FIG. 4, longitudinal direction). Further, "the direction orthogonal to the document transporting direction" is to be referred to as "the width direction" hereafter.

The width measurement, from the one edge to the other edge of the width direction of the pick-up rollers 26, the separate rollers 23, and the retard rollers 31 arranged in a plurality, is to be W1, and the center line of the width measurement W1 is to be O1.

Moreover, the first feed rollers 32 are disposed in a plurality (in this example, two), and are arranged in proximity to one another. The extra rollers 32 are also disposed in a plurality (in this example, two), and are arranged in proximity to one another.

The second feed rollers 33 are disposed with appropriate intervals in the width direction and are arranged in a plurality (in this example, three).

Moreover, the width measurement from the one edge to the other edge of the width direction of the first feed rollers 32 disposed in a plurality is to be W2, and the center line of the width measurement W2 is to be O2.

The width measurement from one edge to the other edge of the width direction of the second feed rollers 33 arranged in a plurality is to be W3, and the center line of the width measurement W3 is to be O2. In other words, the center line of the first feed roller 32 and the center line of the second feed roller 33 correspond at O2.

In this manner, a plurality of the pick-up rollers 26, the separate rollers 23, the retard rollers 31, the first feed rollers 32, the extra rollers 32a, and the second feed rollers 33 for separating and transporting the documents D are respectively arranged in the width direction, a plurality of rollers are contacted against the documents D when separating and transporting the documents D of either size, and normal separation and transportation can be carried out under the stable condition without the skewing of the documents D.

Furthermore, a supplementary second feed roller 33s is disposed in the fixed guide 9a side of the width direction of the second feed roller 33, with an appropriate interval. A support roller 33j and the supplementary second feed roller 33s are disposed in the movable guide 9b side, with appropriate intervals.

The nip pressure of the supplementary second feed roller 33s and the extra rollers 33a, 33b is set to be lower than the nip pressure of the second feed roller 33 and the extra rollers 33a, 33b.

When transporting the documents D of large sizes such as B4 or A3, the documents D are to be transported normally under a stable condition by using the supplementary second feed rollers 33s and the support roller 33j provided in the movable guide 9b side, in addition to the second feed roller 33.

Further, the support roller 33j is supporting the documents D for preventing the documents D to be transported from being bent or flexed between the second feed roller 33 and the supplementary second feed roller 33s.

Moreover, the disposed positions in the width direction of the pick-up rollers 26, the separate rollers 23, and the retard rollers 31 having the width measurement W1 are to be settled within the width measurement of the documents D of the smallest size (in this example, the documents D of A5 size), of the transportable document sizes stacked and arranged to the inner wall surface of the fixed guide 9a.

Moreover, the width direction positions of the first feed roller 32 and the second feed roller 33 are located such that the center line O2 is to be at a position displaced to the movable guide 9b side by a distance d1 from the center line O1 of the separate rollers 23 and the retard rollers 31.

In addition, the first feed roller 32 and the second feed roller 33 are disposed such that the center line O2 is to be located a certain distance d2 away from the position adjusting standard line S. The distance d2 is adjusted such that the disposed positions of the first feed rollers 32 and the second feed rollers 33 are located at the center position of the length of A4, letter size or legal size, in other words, 108 mm from the position adjusting standard line S.

In other words, by situating the center line O2 in a position displaced to the movable guide 9b side relative to the center line O1, the first feed rollers 32 and the second feed rollers 33 are disposed at a position where the documents of various sizes can be sent directly to the reading apparatus, and the separate rollers 23 and the retard rollers 31 can be disposed at a position not to fall out from the width measurement of the documents D of the smallest size.

In this manner, by employing the pick-up rollers 26, the separate rollers 23, and the retard rollers 31 arranged in a plurality within the document width of the smallest size, when transporting the documents D of the smallest size, all of the separate rollers 23 and the retard rollers 31 are to be contacted against the documents D, and the separation and the transportation can be carried out under a normal state and stably by preventing the skewing of the documents D.

The position of the pick-up rollers 26, the separate rollers 23 and the retard rollers 31 can be of any position within the document width of the smallest size. However, it is preferable to be disposed at a position as away as possible from the inner wall surface of the fixed guide 9a which is the standard line S.

The efficiency of the feeding of the documents D of the smallest size improves by disposing the pick-up rollers 26, the separate rollers 23, and the retard rollers 31 in the center of the documents D of the smallest size. However, the documents D of the large sizes are prone to be skewed, thus the rollers 26, 23, 31 are employed to overlap the position most far away from the standard line S of the documents D of the smallest size.

Further, in this case, when the pick-up roller 26 contacts with the documents D, there are cases in which the documents D are skewed. Thus, the contacting force of the pick-up roller 26 against the documents D can be stronger than the inertial force of the documents D in order to prevent the skew of the documents when the pick-up roller 26 is contacting against the documents.

Figure 6:
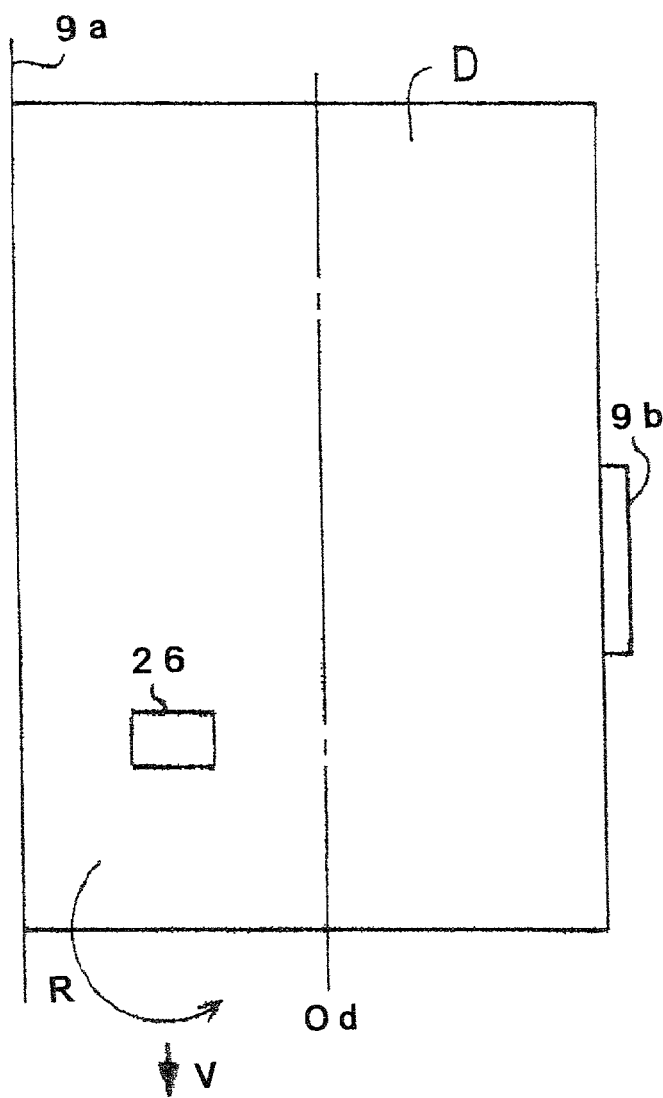
FIG. 6 is an illustration showing a force in a rotating direction applied to documents by being pressured by the pick-up roller.

In other words, as shown in FIG. 6, in the case the contacting position of the pick-up roller 26 against the documents D is displaced greatly from the center line Od of the document width, when trying to feed the documents D by the pick-up roller 26, the part of the documents D that is the anti-pick-up roller 26 side (that is, the opposite side of the center line Od) receives a resisting force against the transporting direction V by the inertial force during the suspension. As a result, since a force is applied to the direction in which the documents D are rotating in the arrow direction R of FIG. 6, in the case the fixed guide 9a does not extend to the proximity to the back end of the document feeding tray in the document transporting direction, the documents D are to be rotated in the arrow direction.

In this case, by enlarging the contacting pressure against the documents D of the pick-up roller 26 and suppressing the rotating force to the arrow direction R by the inertial force of the documents D, the skewing of the documents D when the documents D are pressed against the pick-up roller 26, or when the documents D are fed in, can be prevented.

Furthermore, according to the embodiment of the paper feeding apparatus of the present invention, since the fixed guide 9a is employed extending to the proximity of the back end of the document feeding tray 9 in the document transporting direction, the rotating and skewing of the documents D can be reliably prevented by the fixed guide 9a.

Moreover, the pick-up arm 24 supporting the pick-up roller 26 is supported by the driving shaft 22 which drives the separate roller 23. The separate roller 23 and the pick-up roller 26 are disposed in a plurality so as to be symmetric with the center line O1 as the center.

For example, in the case the pick-up roller 26 is a wide roller having a width measurement W1, when the pick-up roller 26 contacts against the documents D and the documents D are skewed, since the pick-up roller 26 does not contact against the document evenly, the documents are prone to be transported with the documents skewed. However, according to the embodiment, when the pick-up roller 26 is constructed by providing a plurality of narrow rollers, since the pick-up roller 26 contacts to the documents D evenly, the documents D can be fed straightly. Thus, it is preferable to construct the pick-up roller 26 by providing a plurality of narrow rollers, than by providing a single wide roller. By providing a separate roller and retard roller in the place of the narrow rollers, same effect can be earned.

Furthermore, when the pick-up roller 26 contacts with the documents D, to prevent the skewing, the interval of a plurality of pick-up rollers 26 disposed in symmetry with respect to the center line O1, can be considered to be wide.

Moreover, by strengthening the contacting pressure of the pick-up roller 26 against the documents D to be stronger than the inertial force of the documents D, the skewing of the documents D can be prevented when the pick-up roller 26 is contacted against the documents D.

By combining the method of widening the interval of the plurality of pick-up rollers 26, and the method of enlarging the contacting pressure of the pick-up roller 26 against the documents D, the effect of preventing the documents D from being skewed can be further raised.

Furthermore, since the first feed rollers 32 and the second feed rollers 33 are disposed at positions effective for preventing the documents of various sizes from being skewed, the separation and transportation of all of the documents D of transportable sizes, including the documents D of the smallest size, can be carried out under a normal state and stably to the reading unit.

Moreover, as shown in FIG. 1, FIG. 2 and FIG. 4, the fixed guide 9a disposed in the document feeding tray 9 extends to the proximity of the back end of the document feeding tray 9 in the document transporting direction.

Figure 5:
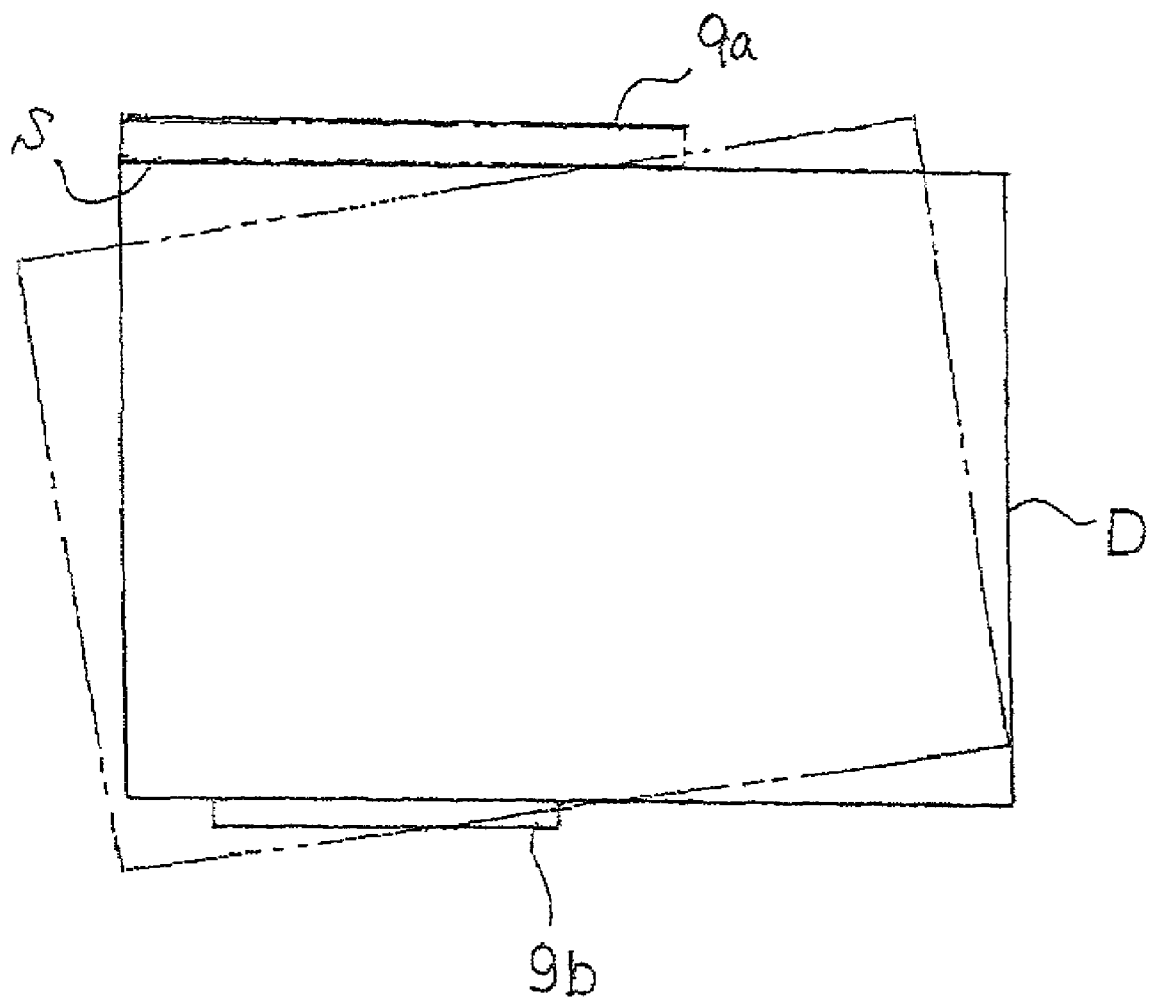
FIG. 5 is a plan view showing a state in which a document is overlapping on a fixed guide.

For example, in the case the fixed guide 9a is formed so as to extend only to the middle section of the document feeding tray 9 in a document transporting direction without reaching the back end of the document feeding tray 9, the back end of the documents D stacked on the document feeding tray 9 is to be positioned behind the fixed guide 9a, and as shown in FIG. 5, the documents D are skewed during the transportation and the documents D overlap on the fixed guide 9a.

Therefore, in this embodiment, the fixed guide 9a extends long to proximity of the back end of the document feeding tray 9 in the document transporting direction, and it is constructed such that the back end of the documents D is not displaced from the fixed guide 9a, and the overlapping of the documents D to the fixed guide 9a is prevented.

In addition, even in the case the fixed guide 9a extends to the proximity of the back end of the document feeding tray 9, since the movable guide 9b disposed in the opposite side to the fixed guide 9a is formed shorter than the fixed guide 9a, there is a possibility for the documents D to be transported overlapping on the movable guide 9b.

An engaging member engaging with the documents D is provided in the inner wall surface of the movable guide 9b, and the warping of the documents D is prevented as to be described below.

Figure 7:
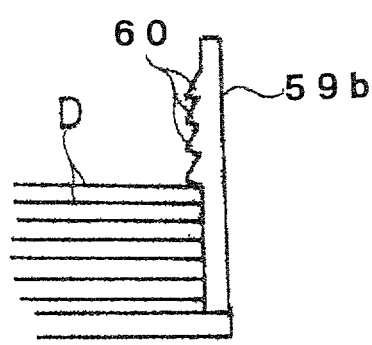
FIG. 7 is a cross-sectional view of the fixed guide, and shows an example in which a warp preventing member is formed on an inner wall surface of the fixed guide.

In other words, like the movable guide 59b shown in FIG. 7, a plurality of saw-blade-shaped warp preventing protrusions 60 are formed in the inner wall surface. The warp preventing protrusions 60 prevent the documents D from overlapping the movable guide 59b by being warped to the upside.

Figure 8:
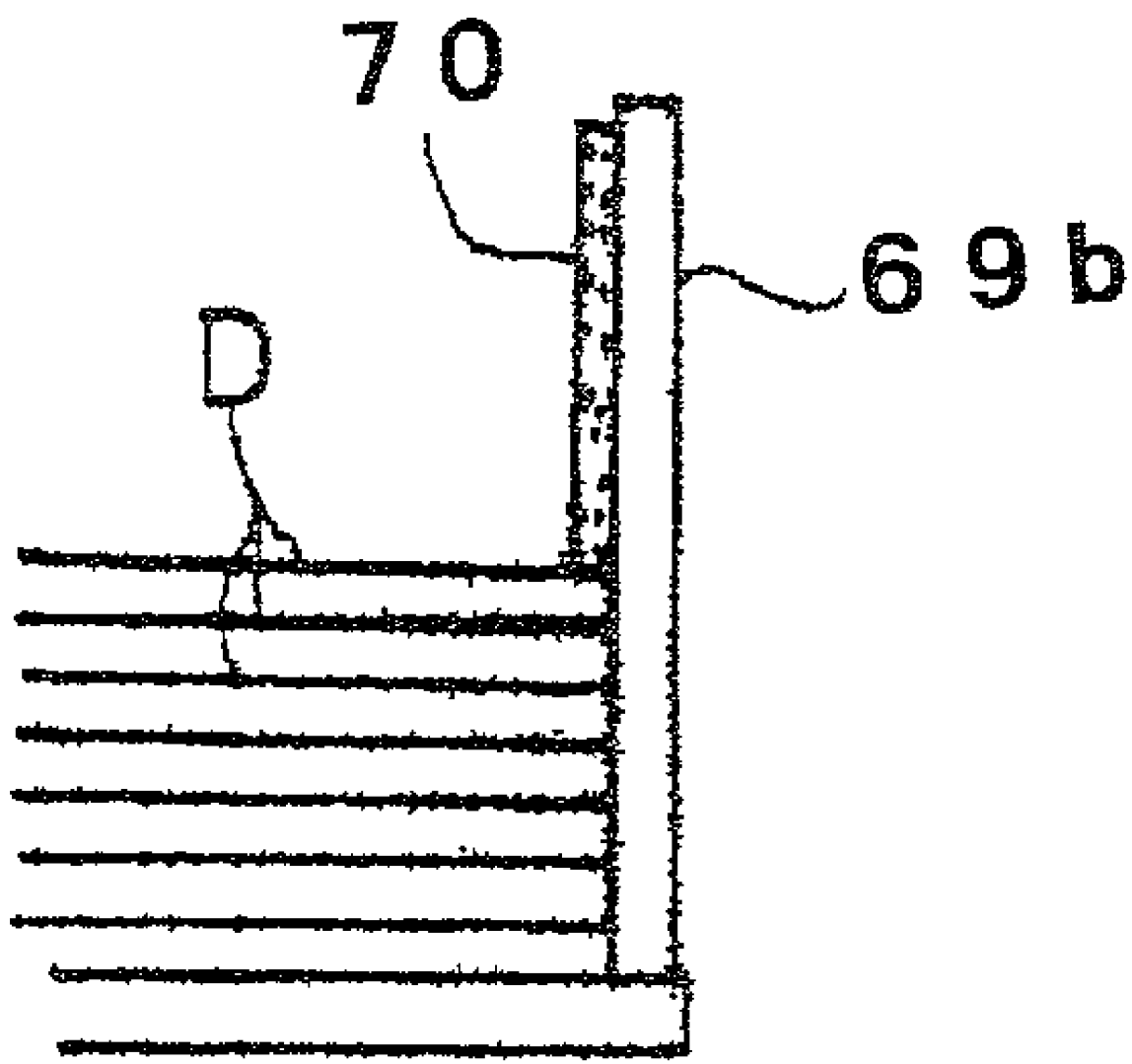
FIG. 8 is a cross-sectional view of the fixed guide, and shows another example in which a warp preventing member is attached on an inner wall surface of the fixed guide.

Moreover, like the movable blade 69b shown in FIG. 8, a warp preventing member 70 having high friction member of such as a felt or a cork can be attached to the inner wall surface. In this case, the documents D contacting against the inner wall surface are prevented from being warped by the friction force of the warp preventing member 70, and it is possible to prevent the documents D from warping toward the upper side and from overlapping to the movable guide 69b.

By preventing the documents D from overlapping the movable guides 59b, 69b in this manner, the documents D to be transported slide straightly along the inner wall surface of the movable guides 59b, 69b, and the skewing can be reliably prevented.

Further, as shown in FIG. 7 and FIG. 8, to facilitate the loading of the documents to be stacked on the document feeding tray 9, the warp preventing protrusions 60 or the warp preventing member 70 are disposed with a certain height secured.

Furthermore, the warp preventing protrusions 60 or the warp preventing member 70 may be disposed on the fixed guide 9a side, or may be disposed on both the fixed guide 9a and the movable guide 9b.

It should be noted that a paper feeding apparatus according to the present invention may be also applied to an image forming apparatus such as a copying machine or the like.

What is claimed is:

1. An automatic image reading apparatus comprising a paper feeding apparatus wherein the paper feeding apparatus includes:
   a document feeding tray for stacking documents;
   a fixed guide disposed as a standard of position adjustment of the documents at one side of the document feeding tray so as to face in an orthogonal direction against a document transporting direction;
   a pick-up roller disposed within the smallest document width of a plurality of transportable document sizes for picking and feeding the documents;
   a separate roller disposed in the downstream of the pick-up roller and located within said smallest document width; and
   a first feed roller disposed in the downstream of the separate roller,
   wherein a distance between the fixed guide and a center of the first feed roller in terms of the orthogonal direction against the document transporting direction is longer than a distance between the fixed guide and a center of the separate roller in terms of the orthogonal direction against the document transporting direction.

2. The automatic image reading apparatus according to claim 1 further including a document reading unit, wherein the paper feeding apparatus further includes:
   a retard roller contacting with the separate roller;
   a second feed roller disposed in the downstream of the first feed roller for transporting the document fed by the pick-up roller, the separate roller and the first feed roller toward the document reading unit and transporting the read document to the downstream of the second feed roller;
   a discharging roller disposed in the downstream of the second feed roller for discharging the document; and
   a discharging tray for receiving the document discharged by the discharging roller,
   wherein when one document is fed between the separate roller and the retard roller by the pick-up roller, the retard roller rotates in a direction of feeding the document toward the downstream in cooperation with the separate roller, and when at least two documents are fed between the separate roller and the retard roller by the pick-up roller, the retard roller reversely rotates in a direction of pushing back the document(s) of a retard roller side.

3. A facsimile apparatus comprising a paper feeding apparatus wherein the paper feeding apparatus includes:
- a document feeding tray for stacking documents;
- a fixed guide disposed as a standard of position adjustment of the documents at one side of the document feeding tray so as to face in an orthogonal direction against a document transporting direction;
- a pick-up roller disposed within the smallest document width of a plurality of transportable document sizes for picking and feeding the documents;
- a separate roller disposed in the downstream of the pick-up roller and located within said smallest document width; and
- a first feed roller disposed in the downstream of the separate roller,
- wherein a distance between the fixed guide and a center of the first feed roller in terms of the orthogonal direction against the document transporting direction is longer than a distance between the fixed guide and a center of the separate roller in terms of the orthogonal direction against the document transporting direction.

4. The facsimile apparatus according to claim 3 further including a document reading unit, wherein the paper feeding apparatus further includes:
- a retard roller contacting with the separate roller;
- a second feed roller disposed in the downstream of the first feed roller for transporting the document fed by the pick-up roller, the separate roller and the first feed roller toward the document reading unit and transporting the read document to the downstream of the second feed roller;
- a discharging roller disposed in the downstream of the second feed roller for discharging the document; and
- a discharging tray for receiving the document discharged by the discharging roller,
- wherein when one document is fed between the separate roller and the retard roller by the pick-up roller, the retard roller rotates in a direction of feeding the document toward the downstream in cooperation with the separate roller, and when at least two documents are fed between the separate roller and the retard roller by the pick-up roller, the retard roller reversely rotates in a direction of pushing back the document(s) of a retard roller side.

5. A copying machine comprising a paper feeding apparatus wherein the paper feeding apparatus includes:
- a document feeding tray for stacking documents;
- a fixed guide disposed as a standard of position adjustment of the documents at one side of the document feeding tray so as to face in an orthogonal direction against a document transporting direction;
- a pick-up roller disposed Within the smallest document width of a plurality of transportable document sizes for picking and feeding the documents;
- a separate roller disposed in the downstream of the pick-up roller and located within said smallest document width; and
- a first feed roller disposed in the downstream of the separate roller,
- wherein a distance between the fixed guide and a center of the first feed roller in terms of the orthogonal direction against the document transporting direction is longer than a distance between the fixed guide and a center of the separate roller in terms of the orthogonal direction against the document transporting direction.

6. The copying machine according to claim 5 further including a document reading unit, wherein the paper feeding apparatus further includes:
- a retard roller contacting with the separate roller;
- a second feed roller disposed in the downstream of the first feed roller for transporting the document fed by the pick-up roller, the separate roller and the first feed roller toward the document reading unit and transporting the read document to the downstream of the second feed roller;
- a discharging roller disposed in the downstream of the second feed roller for discharging the document; and
- a discharging tray for receiving the document discharged by the discharging roller,
- wherein when one document is fed between the separate roller and
- the retard roller by the pick-up roller, the retard roller rotates in a direction of feeding the document toward the downstream in cooperation with the separate roller, and when at least two documents are fed between the separate roller and the retard roller by the pick-up roller, the retard roller reversely rotates in a direction of pushing back the document(s) of a retard roller side.

* * * * *